United States Patent
Kim et al.

(10) Patent No.: US 9,714,023 B2
(45) Date of Patent: Jul. 25, 2017

(54) SYSTEM AND METHOD FOR CONTROLLING HYBRID VEHICLE

(71) Applicants: Hyundai Motor Company, Seoul (KR); Kia Motors Corporation, Seoul (KR); Seoul National University R & DB Foundation, Seoul (KR)

(72) Inventors: Hyunsup Kim, Seoul (KR); Seok Joon Kim, Gyeonggi-do (KR); Hyun Sub Lee, Gyeonggi-do (KR); Jong Ryeol Jeong, Seoul (KR); Hee Yun Lee, Seoul (KR); Suk-Won Cha, Seoul (KR)

(73) Assignees: Hyundai Motor Company, Seoul (KR); Kia Motors Corporation, Seoul (KR); Seoul National University R & DB Foundation, Seoul (KR)

( * ) Notice: Subject to any disclaimer, the term of this patent is extended or adjusted under 35 U.S.C. 154(b) by 0 days.

(21) Appl. No.: 14/950,129

(22) Filed: Nov. 24, 2015

(65) Prior Publication Data
US 2017/0036663 A1    Feb. 9, 2017

(30) Foreign Application Priority Data
Aug. 4, 2015 (KR) .................. 10-2015-0110154

(51) Int. Cl.
*B60L 11/00* (2006.01)
*B60W 20/13* (2016.01)
(Continued)

(52) U.S. Cl.
CPC ............ *B60W 20/13* (2016.01); *B60K 6/20* (2013.01); *B60W 10/06* (2013.01); *B60W 10/08* (2013.01);
(Continued)

(58) Field of Classification Search
CPC ............ B60L 15/2045; B60L 2240/62; B60L 2260/54; Y02T 10/645; Y02T 10/7283
(Continued)

(56) References Cited

U.S. PATENT DOCUMENTS

| | | | |
|---|---|---|---|
| 2002/0107618 A1* | 8/2002 | Deguchi | B60K 6/442 701/22 |
| 2008/0319595 A1* | 12/2008 | Yamamoto | B60L 15/2045 701/22 |
| 2009/0259363 A1 | 10/2009 | Li et al. | |

FOREIGN PATENT DOCUMENTS

| | | |
|---|---|---|
| JP | 2010-052652 A | 3/2010 |
| JP | 4894909 B2 | 3/2012 |

(Continued)

OTHER PUBLICATIONS

Lee, Heeyun et al., "Study on Power Management Strategy of HEV using Stochastic Optimal Control Approach", The Korean Society of Automotive Engineers, (Nov. 2014), pp. 1248-1249, English Abstract, 3 pages.

(Continued)

*Primary Examiner* — Gertrude Arthur Jeanglaude
(74) *Attorney, Agent, or Firm* — Mintz Levin Cohn Ferris Glovsky and Popeo, P.C.; Peter F. Corless

(57) ABSTRACT

A method for controlling a hybrid vehicle is provided. The method includes setting a driving path of the vehicle based on an input destination and current position and predicting a future speed of the vehicle using information regarding the driving path, environmental information, and driving pattern information of a driver. An optimum power distribution map is derived including an optimum SOC trajectory and a power distribution ratio of the engine and the motor using the predicted future speed. Additionally, engine power and
(Continued)

motor power is distributed using the optimum SOC trajectory and a power distribution ratio of the engine and the motor.

5 Claims, 19 Drawing Sheets

(51) Int. Cl.
  *B60K 6/20* (2007.10)
  *B60W 10/06* (2006.01)
  *B60W 10/08* (2006.01)
  *B60W 40/105* (2012.01)
  *G01C 21/36* (2006.01)
  *G01C 21/34* (2006.01)
(52) U.S. Cl.
  CPC ....... *B60W 40/105* (2013.01); *G01C 21/3469* (2013.01); *G01C 21/3605* (2013.01); *B60W 2710/06* (2013.01); *B60W 2710/08* (2013.01); *B60Y 2200/92* (2013.01); *B60Y 2300/18* (2013.01); *B60Y 2300/43* (2013.01); *B60Y 2300/60* (2013.01); *Y10S 903/93* (2013.01)

(58) Field of Classification Search
  USPC .......................... 701/22; 180/65.27, 65.285
  See application file for complete search history.

(56) References Cited

FOREIGN PATENT DOCUMENTS

| | | |
|---|---|---|
| JP | 2014-015125 A | 1/2014 |
| KR | 10-2014-0003890 A | 1/2014 |
| KR | 10-1417401 B1 | 7/2014 |
| KR | 10-2015-0069939 A | 6/2015 |

OTHER PUBLICATIONS

Min, Byungsoon et al., "Development of Fuel Economy Improvement Technique for Hybrid Electric Vehicle by Using Driving Condition Prediction", The Korean Society of Automotive Engineers, (Nov. 2011), pp. 2749-2754, English Abstract, 7 pages.

* cited by examiner

SYSTEM AND METHOD FOR CONTROLLING HYBRID VEHICLE

CROSS-REFERENCE TO RELATED APPLICATION

This application claims priority to and the benefit of Korean Patent Application No. 10-2015-0110154 filed in the Korean Intellectual Property Office on Aug. 4, 2015, the entire contents of which are incorporated herein by reference.

BACKGROUND (a) Field of the Invention

The present invention relates to a system and a method for controlling a hybrid vehicle, and more particularly, to a system and a method for controlling a hybrid vehicle capable of optimizing fuel consumption in the whole region of a designated driving path.

(b) Description of the Related Art

A hybrid electric vehicle may be variously formed using at least two power sources configured of an engine and a motor. The hybrid electric vehicle includes a transmission mounted electric device (TMED) type power train in which a motor, a transmission, and a driving shaft are connected in series. Further, an engine clutch is disposed between the engine and the motor, and thus the hybrid electric vehicle may be driven in an electric vehicle (EV) mode or a hybrid electric vehicle (HEV) mode based on whether the engine clutch is coupled.

The EV mode is a mode in which a vehicle is driven by a driving torque of the motor and the HEV mode is a mode in which the vehicle is driven by a driving torque of the motor and the engine. Therefore, when the hybrid electric vehicle is being driven, the engine may be turned on or off. When a high voltage battery is applied to the TMED type power train, the engine may be turned off in the EV mode. Particularly, the engine may be turned on or off by setting an optimum operating point of the engine. In other words, battery use should be optimized by the hybrid vehicle to maximize improvement in fuel consumption of the hybrid vehicle.

For example, a control of the current hybrid vehicle maximizes system efficiency based on instant driving conditions (e.g., local optimization) and predicts the expected driving conditions and uses the predicted driving conditions to more efficiently use battery energy. In other words, the existing hybrid vehicle control is performed in consideration of the instant driving conditions due to a limitation of operation performance of a controller, a lack of road traffic information, etc. However, the performance of the controller is rapidly improved and the amount and precision of the road traffic information are also increased, and as a result predicting future driving conditions and positively utilizing the predicted driving conditions may be realized.

As an example, a method for controlling a hybrid vehicle improves fuel efficiency by generating a targeted profile when destination information is input under a constant speed drive condition and improves fuel efficiency by applying an optimization technology in a section in which the vehicle is driven in an HEV mode to improve the SOC. As another example, the method for controlling a hybrid vehicle applies a real-time optimization technique at the time of auto cruise driving to extract an optimum fuel efficiency speed profile and then adjust a targeted cruise speed of a vehicle.

The method for controlling a hybrid vehicle is operated by continuously repeating charging and discharging of a battery under congestion driving conditions. In particular, EV mode driving may not sufficiently be implemented due to energy shortage of the battery in a low speed congestion section and the engine should be operated in a low efficiency region to charge the battery.

The above information disclosed in this section is merely for enhancement of understanding of the background of the invention and therefore it may contain information that does not form the prior art that is already known in this country to a person of ordinary skill in the art.

SUMMARY

The present invention provides a system and a method for controlling a hybrid vehicle capable of operating the hybrid vehicle based on an optimum state of charge (SOC) trajectory by predicting future driving conditions in advance in the whole region of a designated driving path.

Further, the present invention provides a system and a method for controlling a hybrid vehicle capable of predicting future driving conditions in advance in a designated driving path, sufficiently charging a battery before the vehicle enters a low speed congestion section, sufficiently using EV mode driving energy in the low speed congestion section, again charging a battery from the time when the vehicle leaves the congestion section.

An exemplary embodiment of the present invention provides a system for controlling a hybrid vehicle that may include: an engine and a motor configured to generate power and a controller configured to operate the engine and the motor. The controller may be configured to operate and include: a path generation unit configured to set a driving path of the vehicle based on a destination and a current position; a speed prediction unit configured to predict a future speed of the vehicle using information regarding the driving path, environmental information, and driving pattern information of a driver; an optimization setting unit configured to derive an optimum SOC trajectory for the whole region of the driving path and a power distribution ratio of the engine and the motor, with respect to the predicted future speed; and a power distribution unit configured to optimally adjust a power distribution to the engine and the motor using the optimum SOC trajectory and the power distribution ratio of the engine and the motor derived by the optimization setting unit.

The path generation unit may be configured to transmit global positioning system (GPS) information and intelligent transport systems (ITS) information regarding the driving path to the speed prediction unit. The GPS information and the ITS information may include gradient information and the environmental information regarding the driving path and the driving pattern information of the driver may include accumulated speed information. The speed prediction unit may be applied with a Markov driver (MD) model to predict a future speed of the vehicle. The optimization setting unit may be applied with a dynamic programming (DP) technique to derive the SOC trajectory for the driving path. The optimization setting unit may be applied with a stochastic dynamic programming (SDP) technique to derive a map data controlled in real time.

Another exemplary embodiment of the present invention provides a method for controlling a hybrid vehicle, that may include: setting a driving path of the vehicle based on a destination and a current position input by a driver; predicting a future speed of the vehicle using information regarding the driving path, environmental information, and driving pattern information of a driver; deriving an optimum power distribution map that includes an optimum SOC trajectory and a power distribution ratio of an engine and a motor using the predicted future speed; and distributing engine power and motor power using the optimum SOC trajectory and the power distribution ratio of the engine and the motor.

The method may further include after the predicting of the future speed of the vehicle, determining whether an event is generated in a driving path; and when the event is generated, recalculating the driving path of the vehicle. When the event is not generated while the vehicle is driving along the driving path, the method may include determining whether an absolute value of a difference between a current SOC and a targeted SOC is greater than a set SOC. When the absolute value of the difference between the current SOC and the targeted SOC is greater than the set SOC, the engine may be operated to be forcibly turned on/off regardless of required power of a driver.

In addition, when the absolute value of the difference between the current SOC and the targeted SOC is less than a set SOC, the on/off of the engine may be executed based on engine on power and engine off power stored in the required power of the driver and the optimum power distribution map. When the current SOC is the set SOC less than the targeted SOC, the battery may be charged by turning on the engine regardless of the required power of the driver. Additionally when the current SOC is the set SOC greater than the targeted SOC, the battery may be discharged by turning off the engine regardless of the required power of the driver.

According to an exemplary embodiment of the present invention, it may be possible to operate the engine and the motor based on the optimum SOC trajectory according to the calculation results of the optimum fuel efficiency control strategy for the future driving conditions in advance before the vehicle is driven. Therefore, it may be possible to improve the efficiency of the system from a standpoint of the vehicle by improving the average driving efficiency of the engine and sufficiently utilizing the EV mode driving.

BRIEF DESCRIPTION OF THE DRAWINGS

A brief description of each drawing is provided to more sufficiently explain the drawings used in the detailed description of the present invention.

DETAILED DESCRIPTION

Figure 1:
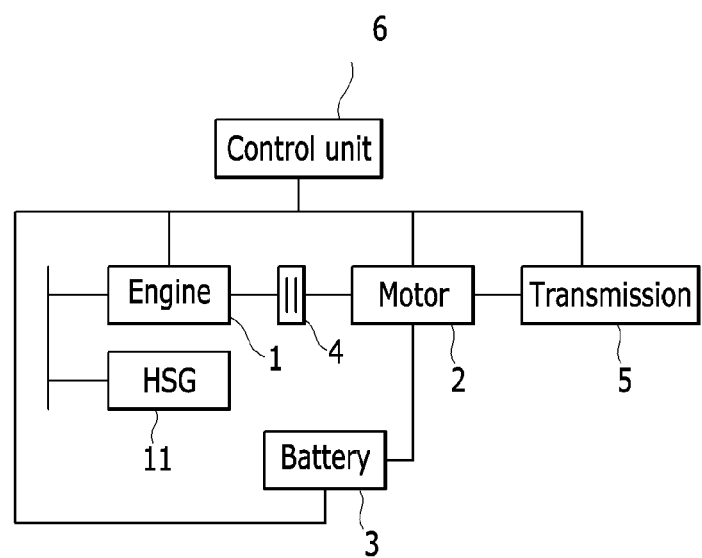
FIG. 1 is a configuration diagram of a control apparatus of a hybrid vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention will be described in detail with reference to the accompanying drawings so that those skilled in the art to which the present invention pertains may easily practice the present invention. As those skilled in the art would realize, the described exemplary embodiments may be modified in various different ways, all without departing from the spirit or scope of the present invention. A part irrelevant to the description will be omitted to clearly describe exemplary embodiments of the present invention, and the same elements will be designated by the same reference numerals throughout the specification.

A hybrid vehicle according to an exemplary embodiment of the present invention to be described below applies a structure of a transmission mounted electric device (TMED) type. However, the scope of the present invention is not limited, and therefore the present invention may also be applied to a hybrid vehicle of other types.

FIG. 1 is a configuration diagram of a control apparatus of a hybrid vehicle according to an exemplary embodiment of the present invention. Referring to FIG. 1, a system for controlling a hybrid vehicle according to an exemplary embodiment of the present invention may include an engine 1, an HSG 11, a motor 2, a battery 3, a clutch 4, a transmission 5, and a controller 6.

The engine 1 may be configured to combust fuel to generate power and the HSG 11 may be configured to the engine 1 and may operate as a power generator when the engine 1 starts to generate electric energy. The motor 2 may be configured to assist power of the engine 1 and may operate as the power generator during vehicle braking to generate electric energy. The motor 2 may be operated using electric energy charged in the battery 3 and the electric energy generated from the motor 2 and the HSG 11 may be charged in the battery 3. The controller 6 may be configured to operate the components a vehicle including the engine 1, the HSG 11, the motor 2, the battery 3, and the clutch 4. The control portion 6 may be implemented as at least one processor operated by a predetermined program which executes each step of a method for controlling a hybrid vehicle according to an exemplary embodiment of the present invention.

Figure 2:
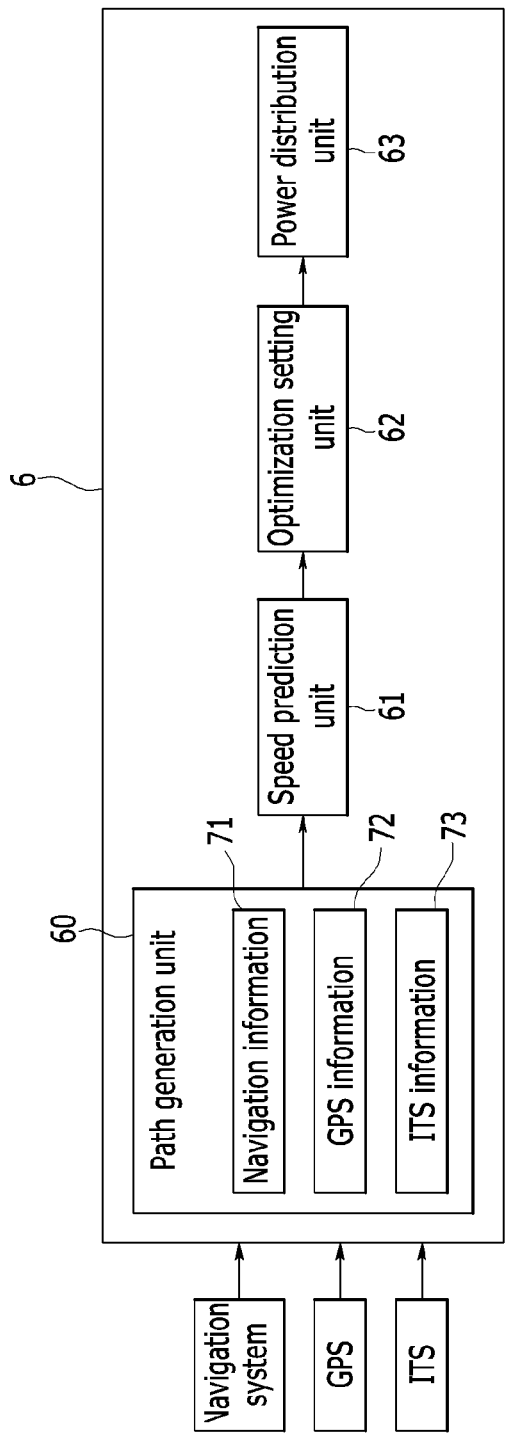
FIG. 2 is a configuration diagram of a controller applied to FIG. 1 according to an exemplary embodiment of the present invention.

FIG. 2 is a configuration diagram of a controller applied to FIG. 1. Referring to FIG. 2, the controller 6 may be configured to receive navigation information 71, GPS information 72, and ITS information 73 to operate the hybrid vehicle based on an optimum SOC trajectory by predicting future driving conditions in advance in the whole region of the designated driving path. In other words, the hybrid vehicle may include a navigation system, a global positioning system (GPS), and an intelligent transport system (ITS).

For example, the controller 6 may include a speed prediction unit 61 configured to predict a future speed of a vehicle based on information 71, 72, and 73 input from a path generation unit 60, an optimization setting unit 62, and a power distribution unit 63. The controller 6 may further include an engine controller configured to operate the engine 1 and the HSG 11, a motor controller configured to operate the motor 2, a transmission controller (TCU) configured to operate the transmission 5, and a battery management system (BMS) configured to operate the battery 3.

The path generation unit 60 may be configured to set the driving path of the vehicle from a destination and a current position input by a driver. In other words, when the destination is input using the navigation system, the path generation unit 60 may be configured to set the driving path of the vehicle using the GPS system and the ITS system from the destination and the current position of the vehicle and transfer the predetermined driving path to the speed prediction unit 61.

Additionally, the path generation unit 60 may be configured to set the driving path of the vehicle using the navigation system mounted within the vehicle using the destination information and the current position of the vehicle input by the driver, the GPS information, and the ITS information. The path generation unit 60 may then be configured to transmit the generated driving path of the vehicle, environmental information, and driving pattern information of the driver to the speed prediction unit 61.

The environmental information may include gradient information and vehicle speed information of a road regarding the generated driving path of the vehicle. In other words, the GPS information and the ITS information may include the gradient information of the road and the vehicle speed information of the road. For example, the vehicle speed information of the road may include a maximum limit speed, a minimum limit speed, and an average vehicle speed.

The driving pattern information of the driver may be accumulated speed information detected in real time by speed sensors (not illustrated) mounted within the vehicle and stored in the controller 6. In other words, the driving pattern information of the driver may be calculated from past speed information. The speed prediction unit 61 may use the information regarding the driving path, the environmental information, and the driving pattern information of the driver to predict the future speed of the vehicle. In particular, the speed prediction unit may be applied with a Markov driver (MD) model to predict the future speed of the vehicle.

The optimization setting unit 62 may be configured to perform optimization of fuel consumption in the whole region of the driving path from the predicted future speed. In other words, the optimization setting unit 62 may be configured to derive the optimum SOC trajectory for the driving path and a power distribution ratio of the engine and the motor. For example, the optimization setting unit 62 may be applied with a dynamic programming (DP) technique or a stochastic dynamic programming (SDP) technique.

Additionally, the optimum SOC trajectory for the driving path may be derived based on the dynamic programming (DP) technique. The optimization setting unit 62 may be configured to apply the stochastic dynamic programming (SDP) technique to derive a map data which may be controlled in real time. The map data may include data of the engine power to the required power of the driver and an optimum power distribution map may optimally distribute the engine 1 power to the required power of the driver and the motor 20 power based on the map data. The optimization setting unit 62 may be applied with various optimization techniques to which various types of control logics may be applied.

The power distribution unit 63 may use the optimization result of fuel consumption in the whole region of the driving path to perform a control to optimally distribute power to the engine 1 and the motor 2. In other words, the power distribution unit 63 may use the SOC obtained as the result of the DP technique and the optimum power distribution map obtained as the result of the SDP technique to perform a control to optimally distribute power to the engine 1 and the motor 2. The power distribution interlocks with the vehicle control logic in real time.

Figure 3:
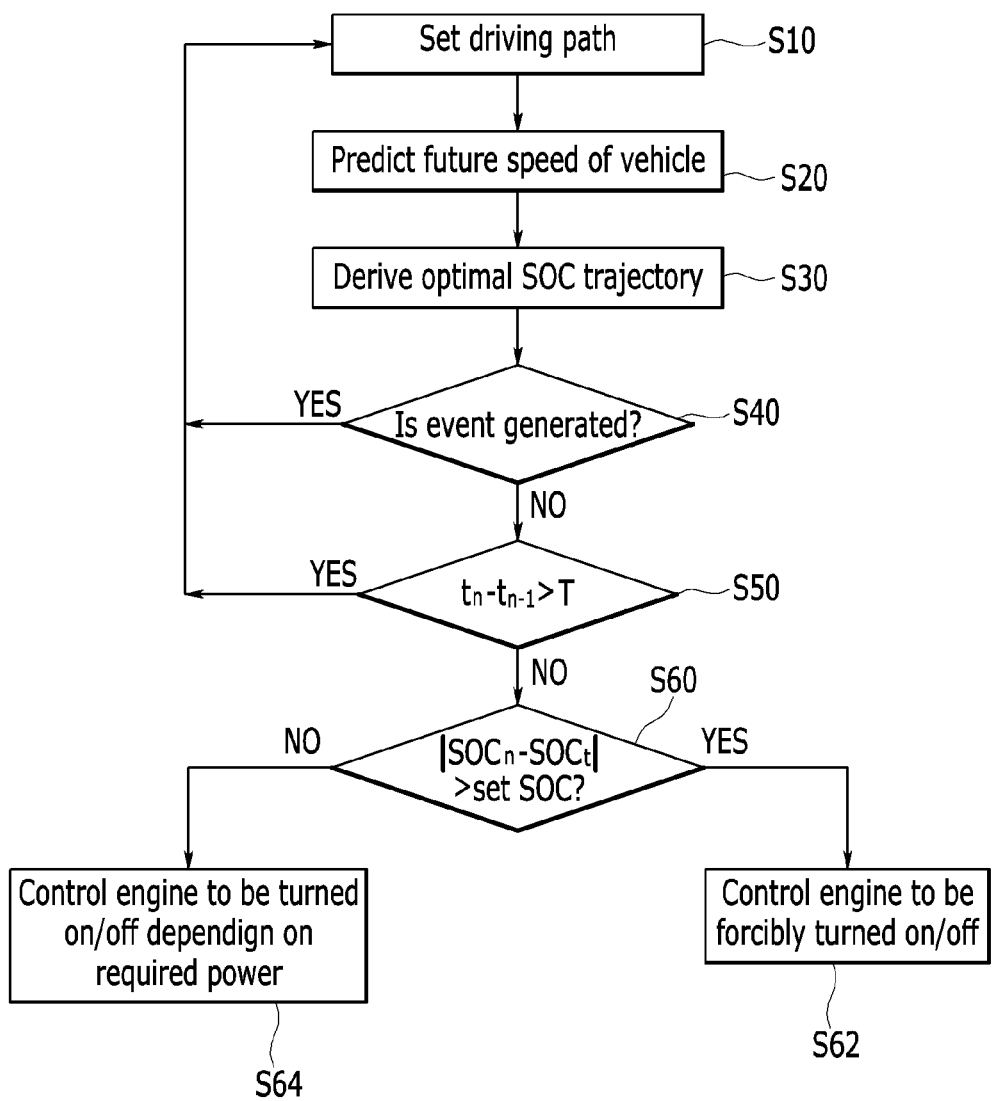
FIG. 3 is a flow chart of a method for controlling a hybrid vehicle according to an exemplary embodiment of the present invention.

FIG. 3 is a flow chart of a method for controlling a hybrid vehicle according to an exemplary embodiment of the present invention. Referring to FIG. 3, a method for controlling a hybrid vehicle according to an exemplary embodiment of the present invention may include a destination setting process (S10), a future speed prediction process (S20), an optimization process (S30), and an optimum power distribution process (S40).

In the destination setting process (S10), when the destination is received through the navigation system, the path generation unit 60 may be configured to set the driving path of the vehicle and transmit the generated driving path and the environmental information to the speed prediction unit 61. In the future speed prediction process (S20), the speed prediction unit 61 may use the information regarding the driving path, the environmental information, and the driving pattern information of the driver to predict the future speed of the vehicle. For example, in the future speed predicting process (S20), the speed prediction unit 61 may use the information regarding the driving path, the environmental information, and the driving pattern information of the driver to predict the future speed of the vehicle.

The optimization setting unit 62 may be configured to derive the optimum SOC trajectory from the future speed of the vehicle predicted by the speed prediction unit 61, the environmental information, and the driving pattern information of the driver (S30). In particular, the optimum SOC trajectory derived by the optimization setting unit 62 may become the targeted SOC trajectory. Further, the controller may be configured to determine whether the event is detected in the driving path of the vehicle (S40). The event may mean the unpredictable situations in which the vehicle is not driven along the driving path (e.g., the driver may be distracted, exit a driving lane, obstacle may be on the road, etc.). When the event is generated, the method proceeds to step S10 to allow the path generation unit to recalculate the driving path of the vehicle.

In the step S40, when the event is not detected, the controller may be configured to determine whether a passage time $t_n$-$t_n$ from the time $t_n$ when the future speed is finally predicted to a current time $t_n$ is greater than a set driving time T (S50). The step S50 is a selective step and therefore may be deleted as needed. In the step S50, when the passage time $t_n$-$t_n$ is greater than the set driving time T, the method proceeds to the step S10.

When the passage time $t_n$-$t_n$ is equal to or less than the set driving time T, the controller may be configured to determine whether a difference between an absolute values of the targeted SOC (SOC) and the current SOC ($SOC_n$) is greater than the set SOC (e.g., about 3%). When the difference between the absolute values of the targeted SOC ($SOC_t$) and the current SOC ($SOC_n$) is greater than the set SOC (e.g., about 3%), the controller may be configured to operate the engine to be forcibly turned on/off (S62). For example, the meaning that the current SOC ($SOC_n$) of the battery 3 is the set SOC to be less than the targeted SOC ($SOC_t$) is that the charging state of the battery 3 may be insufficient (e.g., region under L1 in FIG. 4). Therefore, the engine 1 may be forcibly turned on regardless of the required power of the driver to charge the battery 3, to maintain the SOC to approach a level of the targeted SOC.

Figure 4:
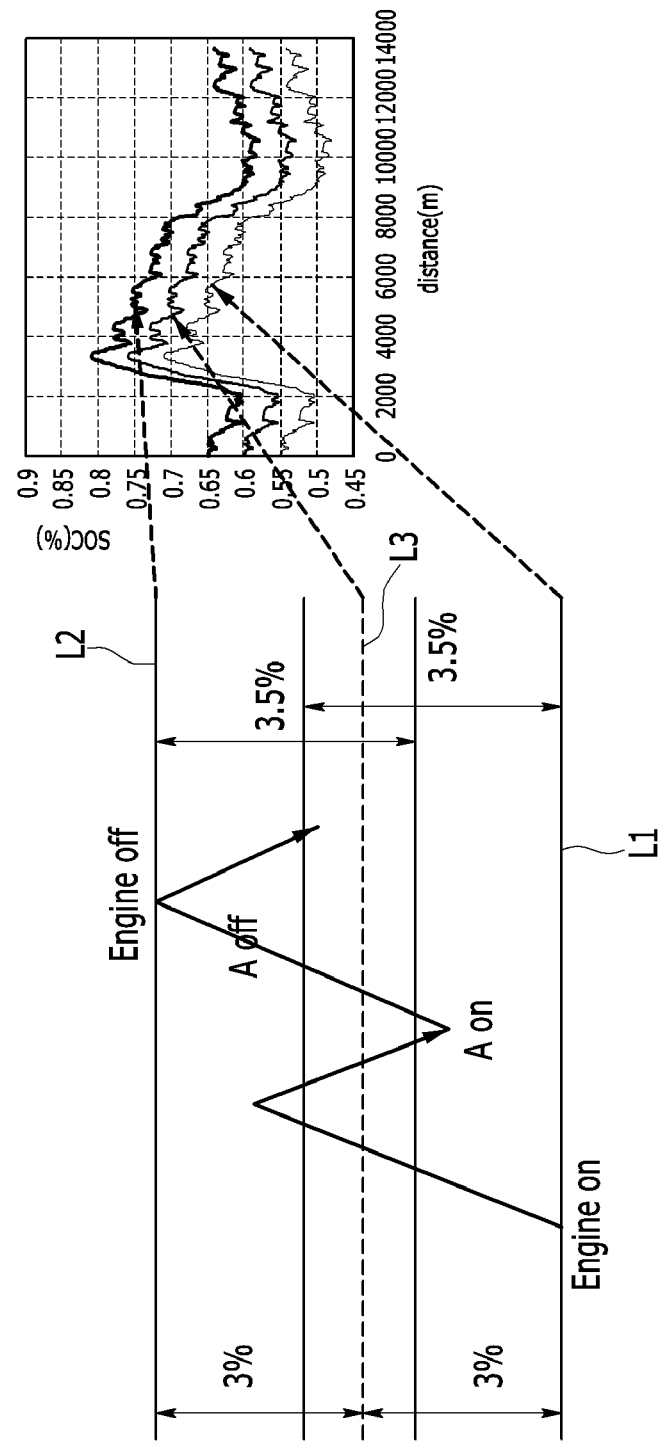
FIG. 4 is a graph illustrating a real time control based on an optimization technique according to an exemplary embodiment of the present invention.

Furthermore, the meaning that the current SOC ($SOC_n$) of the battery 3 is the set SOC greater than the targeted SOC ($SOC_t$) is that the charging state of the battery 3 is excessive (e.g., region above L2 in FIG. 4). Therefore, the engine 1 may be forcibly turned off and the vehicle may be driven by the driving torque of the motor 2 to discharge the battery 3, to maintain the SOC of the battery to approach the level of the targeted SOC.

In the step S60, when the difference between the absolute values of the targeted SOC ($SOC_t$) and the current SOC ($SOC_n$) is equal to or less than the set SOC (e.g., about 3%), the controller may be configured to operate the engine 10 to be turned on/off based on the required power of the driver. In particular, whether the engine starts may be determined by comparing the required power of the driving with engine on power/engine off power. The used engine on power/engine off power use results pre-stored in the optimum power distribution map derived through the optimization setting unit 62. The distribution ratio of the engine power and the motor power based on the required power of the driver may also use the results pre-stored in the optimum power distribution map. Meanwhile, the set amount is not limited to about 3% and may be set according to designer's intention.

FIG. 4 is a graph illustrating a real time control based on an optimization technique. Referring to FIG. 4, the optimization technique based on the DP technique disposes an SOC trajectory L3 between an engine on line L1 and an engine off line L2.

The engine on line L1 may be set to be a set amount (e.g., 3%) lower than the SOC trajectory L3 and the engine off line L2 may be set to be a set amount (e.g., 3%) greater than the SOC trajectory L3. Further, an engine on possible region Aon may be set to further include a set amount (e.g., about 3.5%) above the engine on line L1 and an engine off possible region Aoff may be set to further include the set amount (e.g., 3.5%) under an engine off line L2. In other words, the engine off possible region Aoff overlaps the engine on possible region Aon as much as 0.5% under the SOC trajectory L3. In other words, the engine on possible region Aon overlaps the engine off possible region Aoff as much as 0.5% above the SOC trajectory L3. A reference value of the on/off power of the engine 1 for a high level may be set in the engine off possible region Aoff set above the SOC trajectory L3. The power distribution ratio of the engine 1 and the motor 2 for a low level may be set in the engine on possible region Aon set under the SOC trajectory L3.

Figure 5:
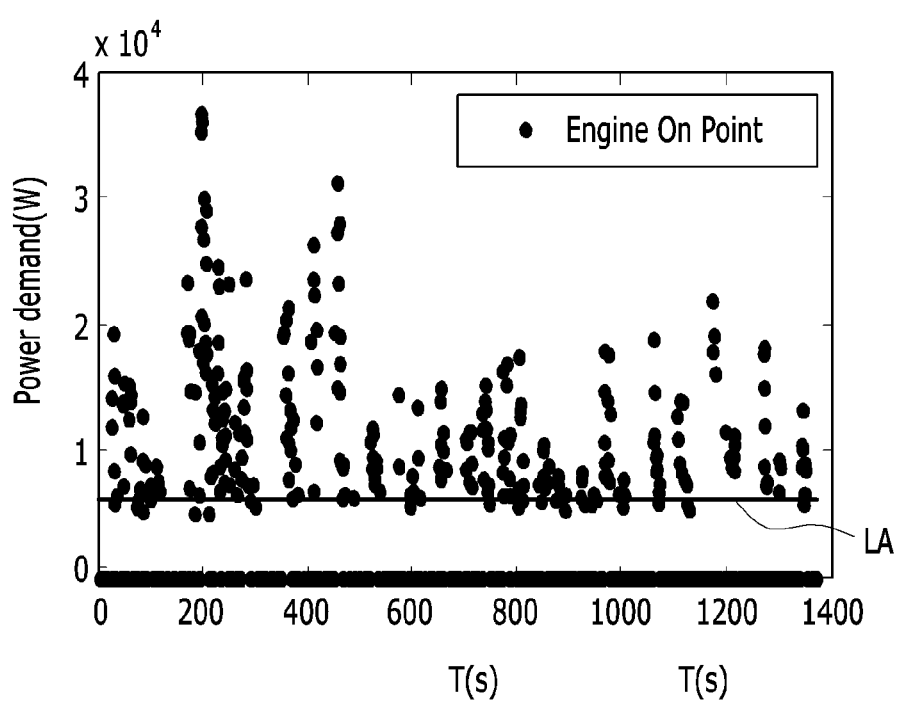
FIG. 5 is a graph determining engine on power according to an exemplary embodiment of the present invention.
Figure 6:
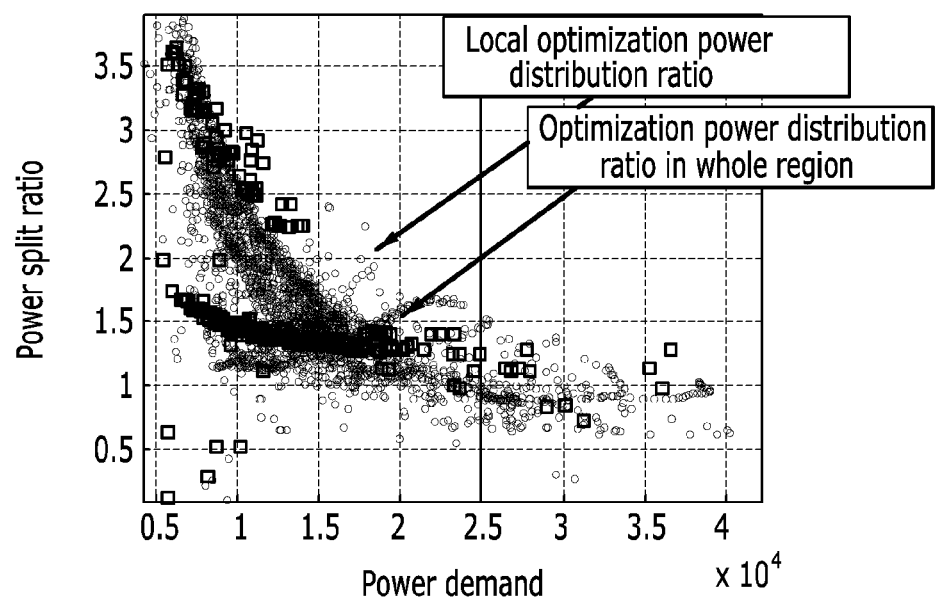
FIG. 6 is a graph illustrating an optimum power distribution ratio of an engine and a motor according to an exemplary embodiment of the present invention.

FIG. 5 is a graph determining engine on power and illustrates on points of the engine 1 for the driving time T and the required power W. Each point is the on points of the engine 1 obtained as the optimum result and each point determines the on/off power of the engine 1. FIG. 6 is a graph illustrating an optimum power distribution ratio of an engine and a motor. Referring to FIG. 6, a relationship between the required power and the power distribution ratio is illustrated. The power distribution ratio may be calculated by dividing the engine power by the required power.

Further, FIG. 6 illustrates an optimization power distribution ratio (quadrangle) in the whole region according to the exemplary embodiment of the present invention and a local optimization power distribution ratio (circle) according to the related art. The optimization power distribution ratio appears more uniformly in the whole region than the local optimization power distribution ratio, in the same required power.

Referring to FIGS. 4 to 6, the current SOC of the battery 3 approaches the targeted SOC by the real time control of FIG. 4. When the SOC is insufficient, if a difference between the targeted SOC and the current SOC is larger than the set amount (for example, 3%), the controller 6 is determined to be the lack of the SOC to control the engine to be forcibly turned on regardless of the required power of the driver, thereby starting the charging of the battery 3. If the charging is performed and thus the difference between the targeted SOC and the current SOC is smaller than the set amount (for example, −0.5%), the controller 6 controls the engine 1 to be turned on/off depending on the required power of the driver.

When the SOC is excessive, if the difference between the targeted SOC and the current SOC is smaller than the set amount (for example, −3%), the controller 6 controls the engine 1 to be forcibly turned off regardless of the required power of the driver, thereby starting the discharging of the battery 3. If the charging is performed and thus the difference between the targeted SOC and the current SOC is larger than the set amount (for example, 0.5%), the controller 6 controls the engine 1 to be turned on/off depending on the required power of the driver.

Further, when the absolute value of the difference between the targeted SOC and the current SOC is less than the set amount (e.g., about 3%), the controller 6 may be configured to compare the required power of the driver with the engine on/off power to determine the on (e.g., the one state) of the engine 1. In particular, the used engine on/off power and the power distribution ratio of the engine motor may be determined by being calculated in advance with the optimized result at the time of setting the path. In other words, the engine on power may be determined as an average value (LA, see FIG. 5) of the minimum required power of the driver when the engine 1 is on. The engine off power may be determined as the average value (LA, see FIG. 5) of the minimum required power of the driver when the engine is off. The engine power may be determined as a product of the required power of the driver by the optimum power distribution ratio and the motor power may be determined as a difference between the required power of the driver and the engine power.

Figure 7:
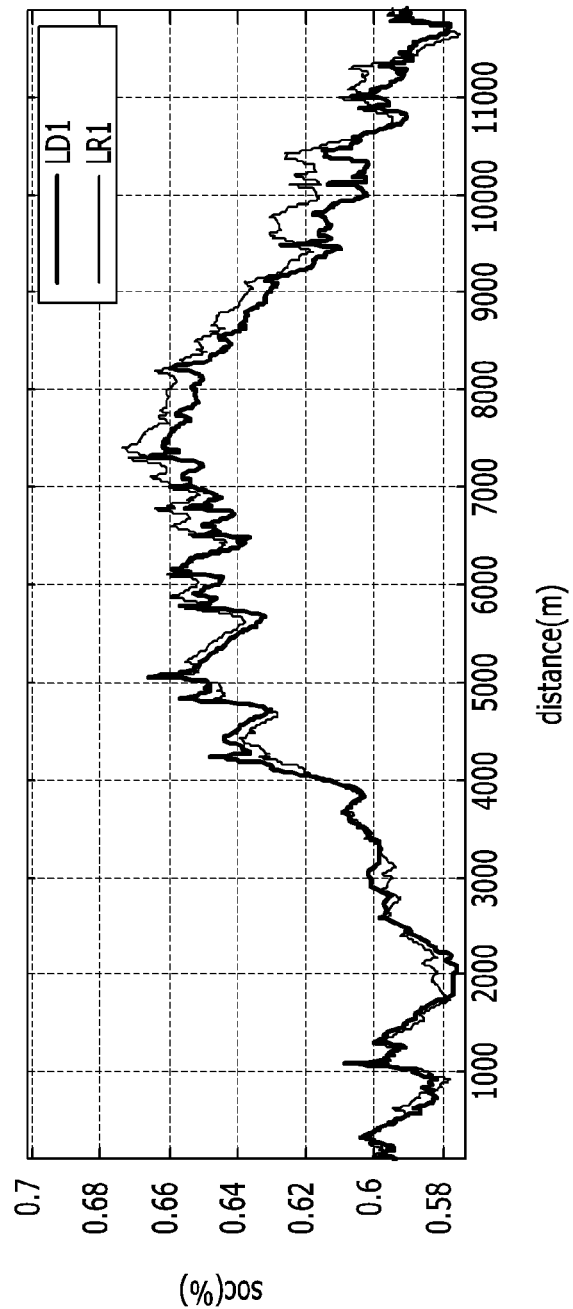
FIG. 7 is a graph illustrating a relationship between a driving distance and an SOC trajectory according to an exemplary embodiment of the present invention.
Figure 8:
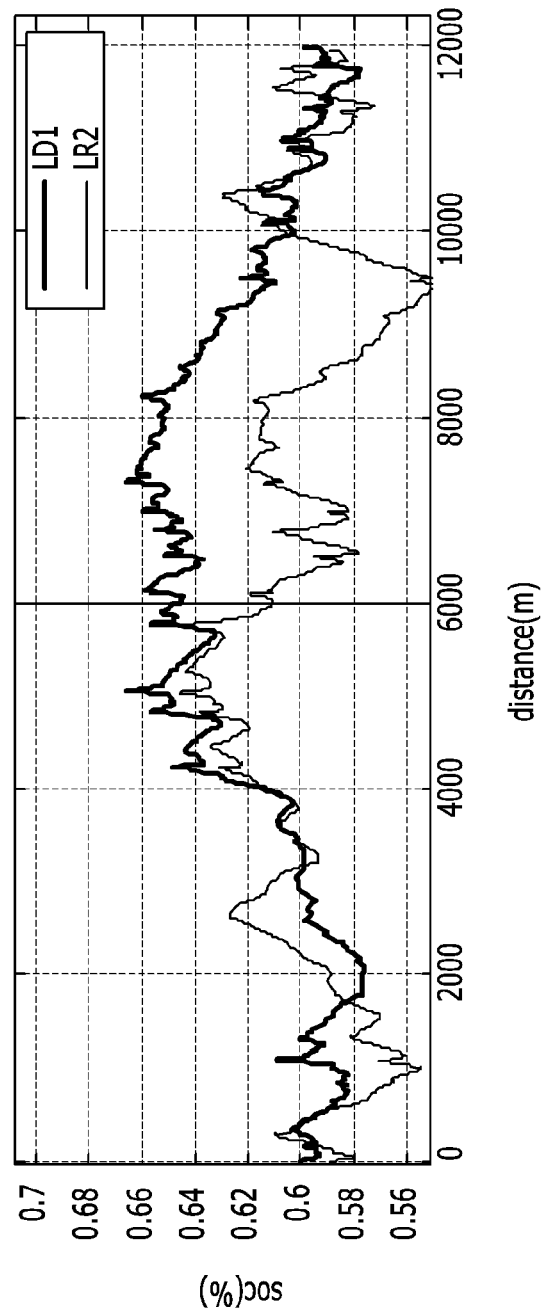
FIG. 8 is a graph illustrating a relationship between a driving distance and an SOC trajectory according to the related art corresponding to FIG. 7.

FIG. 7 is a graph illustrating a relationship between a driving distance and an SOC trajectory according to an exemplary embodiment of the present invention. Referring to FIG. 7, a real SOC trajectory LR1 according to the exemplary embodiment of the present invention appears to approach an optimized SOC trajectory LD1 by the DP technique. FIG. 8 is a graph illustrating a relationship between a driving distance and an SOC trajectory according to the related art corresponding to FIG. 7. Referring to FIG. 8, a real SOC trajectory LR2 according to the related art appears to be considerably spaced apart the optimized SOC trajectory LD1 by the DP technique.

Figure 9:
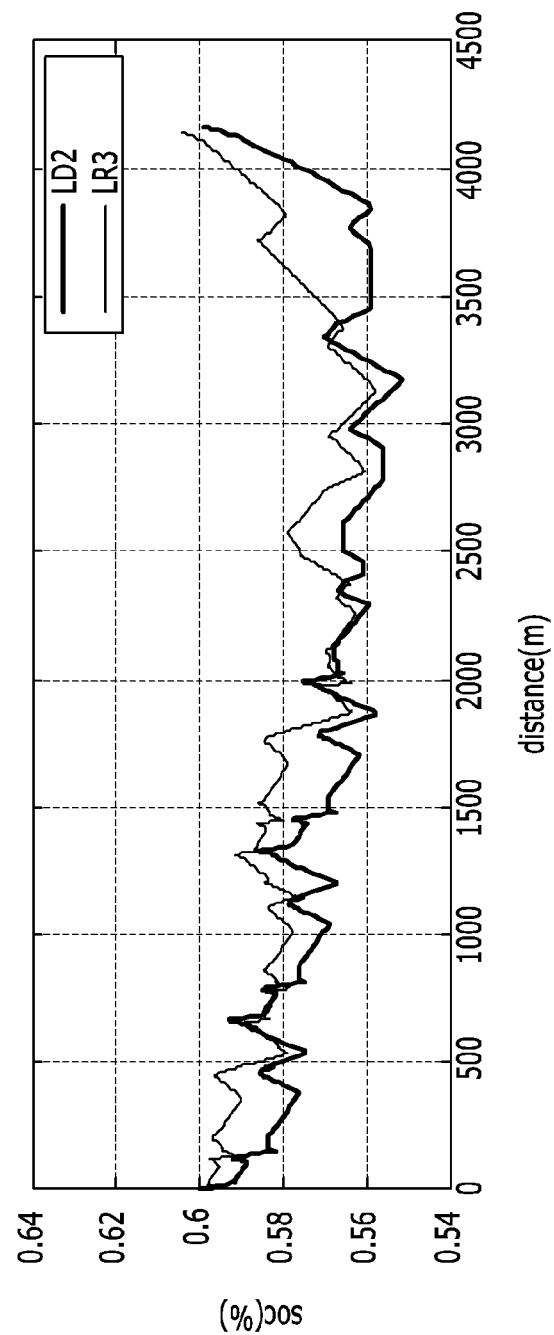
FIG. 9 is a graph illustrating a relationship between a driving distance and an SOC trajectory according to another exemplary embodiment of the present invention.
Figure 10:
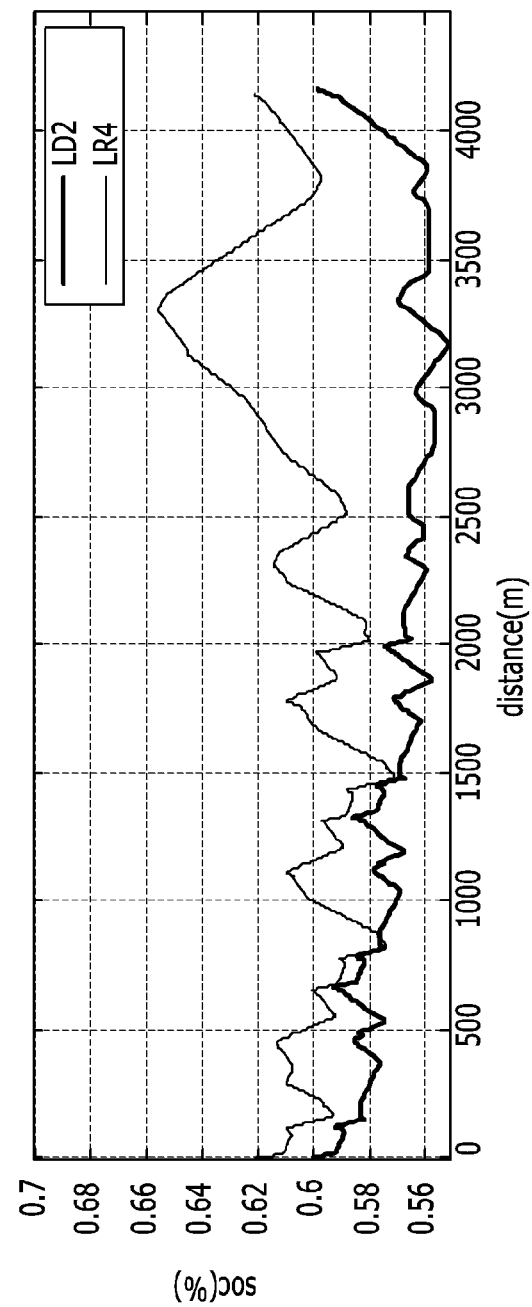
FIG. 10 is a graph illustrating a relationship between a driving distance and an SOC trajectory according to the related art corresponding to FIG. 9.

FIG. 9 is a graph illustrating a relationship between a driving distance and an SOC trajectory according to another exemplary embodiment of the present invention. Referring to FIG. 9, a real SOC trajectory LR3 according to another exemplary embodiment of the present invention appears to approach an optimized SOC trajectory LD2 by the DP technique. FIG. 10 is a graph illustrating a relationship between a driving distance and an SOC trajectory according to the related art corresponding to FIG. 9. Referring to FIG. 10, a real SOC trajectory LR4 according to the related art appears to be considerably spaced apart the optimized SOC trajectory LD2 by the DP technique.

In other words, the SOC trajectories LD1 and LD2 of the DP technique applied as the optimization technique correspond more to the real SOC trajectories LR1 and LR3 according to the exemplary embodiment of the present invention compared to the real SOC trajectories LR2 and LR4 according to the related art, in the whole region of the designated driving path. Therefore, compared to the related art, the exemplary embodiment of the present invention predicts the future driving conditions in advance in the designated driving path to improve the average driving efficiency of the engine 1 and sufficiently utilizes the EV mode driving.

Meanwhile, according to the exemplary embodiment of the present invention, Table 1 may be obtained by comparing fuel efficiency (km/l) for each driving cycle. Compared to the related art, the exemplary embodiment of the present invention has an improved effect in fuel efficiency of 3.63 to 6.78% for each driving cycle.

TABLE 1

| Driving cycle | FTP72 | FTP75 | NEDC | JN1015 | HWFET | SUB00 |
|---|---|---|---|---|---|---|
| conventional art | 22.83 | 22.89 | 22.22 | 22.42 | 24.40 | 24.46 |
| exemplary embodiment | 23.81 | 23.72 | 23.96 | 23.94 | 25.33 | 25.52 |
| Improvement effect (%) | ↑4.28 | ↑3.63 | ↑7.83 | ↑6.78 | ↑3.81 | ↑4.34 |

A federal test procedure (FTP) 72 is an exhaust test mode, a new European driving cycle (NEDC) is a fuel consumption measurement type, and a highway fuel economy test (HWFET) is a fuel consumption mode at an express highway.

Figure 11:
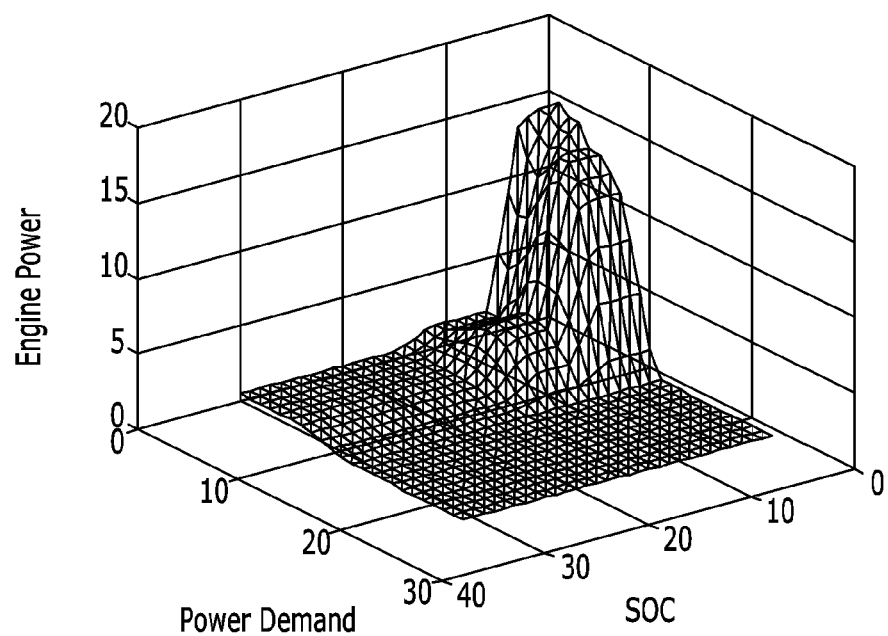
FIGS. 11 to 13 are graphs illustrating optimum engine power maps for each vehicle speed according to an exemplary embodiment of the present invention.
Figure 12:
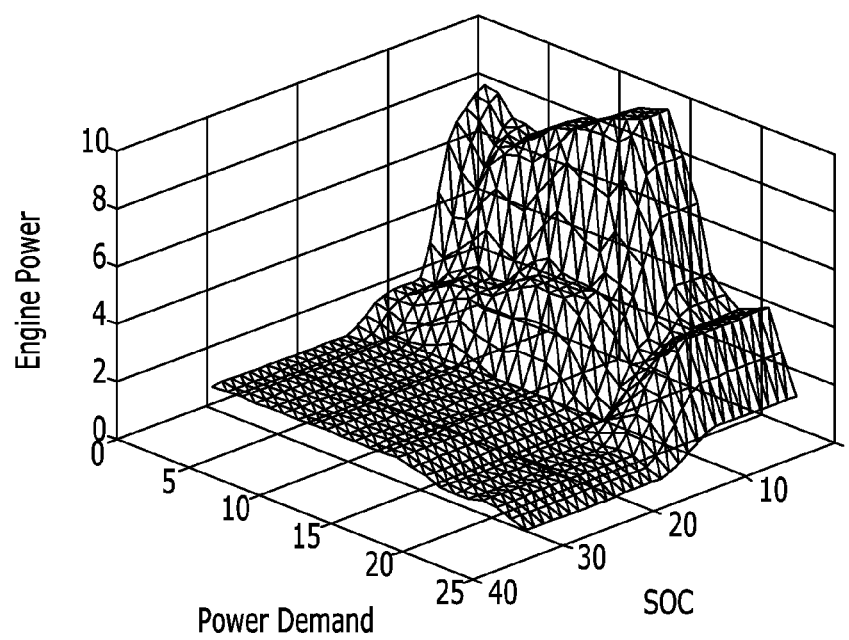
Figure 13:
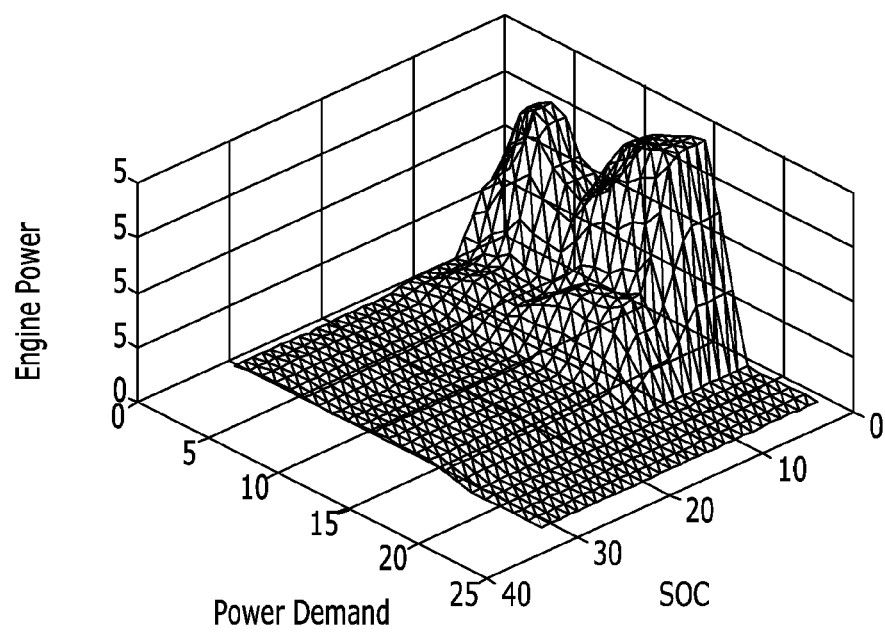

FIGS. 11 to 13 are graphs illustrating optimum engine power maps for each vehicle speed. Referring to FIGS. 11 and 13, the SDP technique implements the engine power map which is optimization resultants. In other words, the engine power may be determined based on the SOC of the engine power map, the vehicle speed, and the required power. When the vehicle speed is determined, the following engine power map may be determined based on the speed. In FIG. 11, the vehicle speed is 18 kph, in FIG. 12, the vehicle speed is 72 kph, and in FIG. 13, the vehicle speed is 108 kph.

The engine power map selected based on the vehicle speed may determine the engine power that corresponds to the required power and the current SOC. In particular, two engine power maps may be used to calculate the engine power using a linear interpolation method. For example, when the vehicle speed is 80 kph, 72 kph and 108 kph maps may be linearly interpolated to determine the engine power. When the determined engine power is greater than 0, the engine 1 may be turned on and the corresponding engine power may be output. The motor power may be determined by a difference between the required power and the engine power. Therefore, the optimum power distribution ratio of the engine 1 and the motor 2 may be determined.

Figure 14:
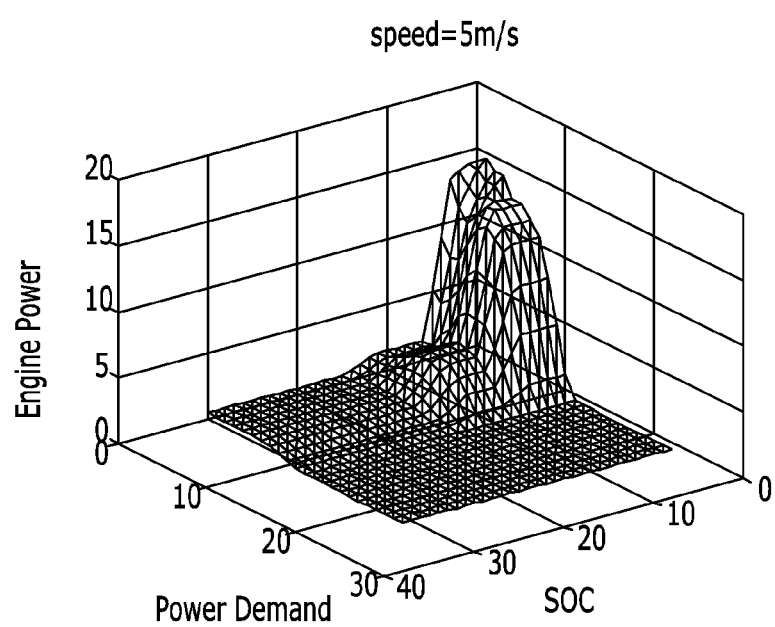
FIGS. 14 to 19 are graphs illustrating optimum engine power maps for various vehicle speeds according to an exemplary embodiment of the present invention.
Figure 15:
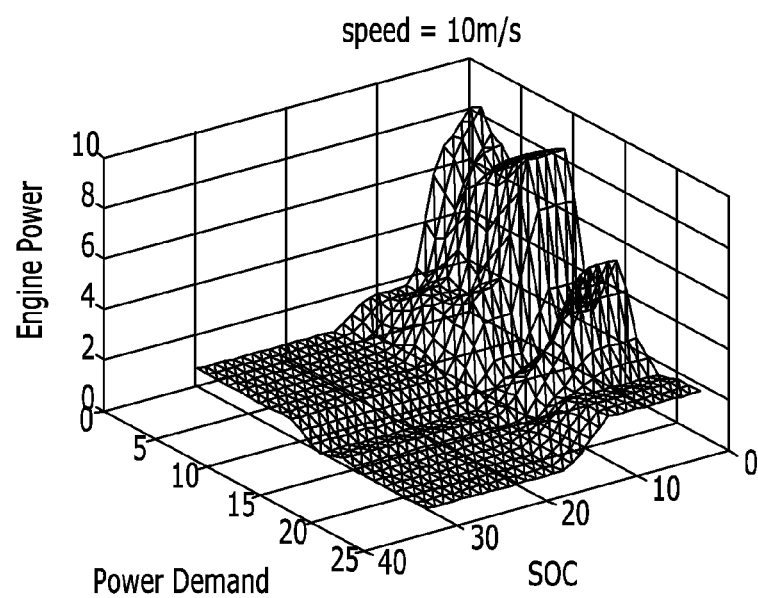
Figure 16:
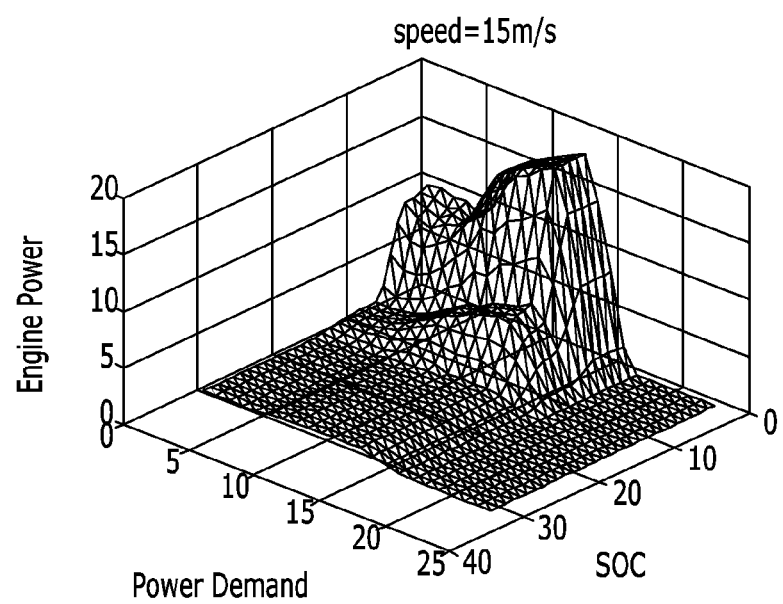
Figure 17:
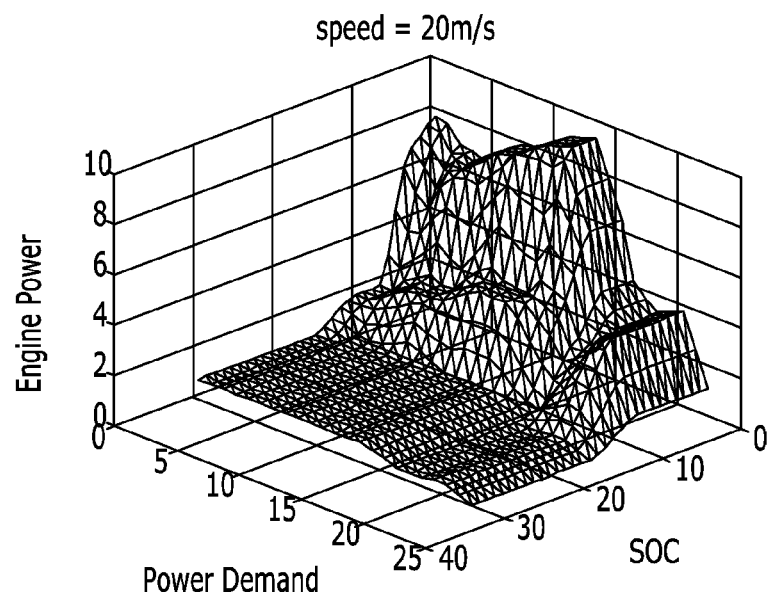
Figure 18:
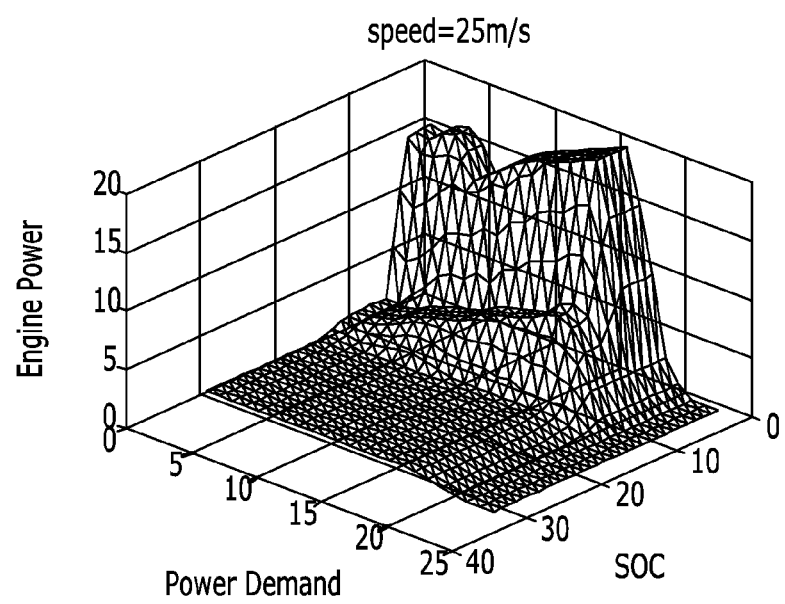
Figure 19:
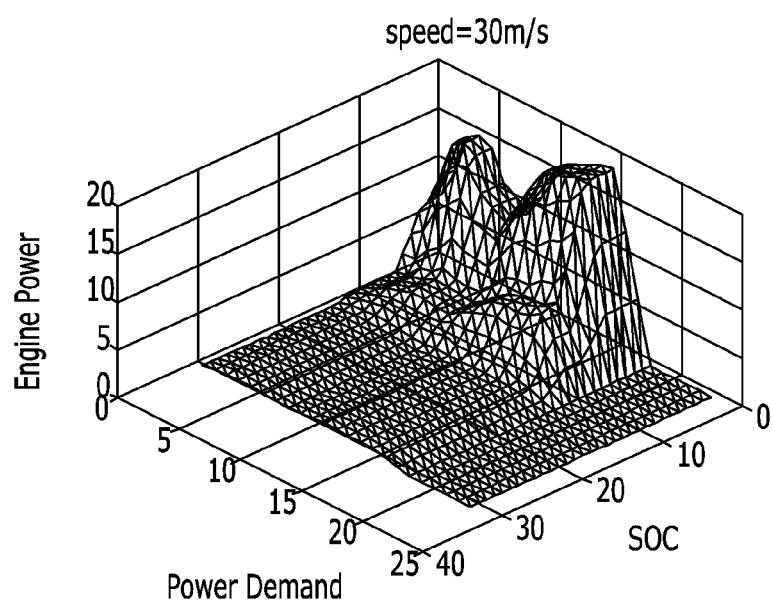

FIGS. 14 to 19 are graphs illustrating optimum engine power maps for various vehicle speeds. In FIG. 14, the vehicle speed is 5 m/s, in FIG. 15, the vehicle speed is 10 m/s, in FIG. 16, the vehicle speed is 15 m/s, in FIG. 17, the vehicle speed is 20 m/s, in FIG. 18, the vehicle speed is 25 m/s, and in FIG. 19, the vehicle speed is 30 m/s. Referring to FIGS. 14 to 19, when the number of optimum engine power maps is increased, the accuracy of the engine power determined based on the SOC of the engine power map, the vehicle speed, and the required power may be further improved. Further, the accuracy of the optimum power distribution ration for the engine 1 and the motor 2 may be improved.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

1: Engine
2: Motor
3: Battery
4: Clutch
5: Transmission
6: Controller (control unit)
11: HSG
61: Speed prediction unit
62: Optimization setting unit
63: Power distribution unit
71: Navigation information
72: GPS information
73: ITS information

What is claimed is:

1. A method for controlling a hybrid vehicle, comprising:
setting, by a controller, a driving path of the vehicle based on a destination and a current position input by a driver;
predicting, by the controller, a future speed of the vehicle using information regarding the driving path, environmental information, and driving pattern information of a driver;
deriving, by the controller, an optimum power distribution map that includes an optimum state of charge (SOC) trajectory and a power distribution ratio of the engine and the motor using the predicted future speed;
distributing, by the controller, engine power and motor power using the optimum SOC trajectory and a power distribution ratio of the engine and the motor;
after the predicting of the future speed of the vehicle, determining, by the controller, whether an event is generated in a driving path;
when the event is generated, recalculating, by the controller, the driving path of the vehicle; and
when the event is not generated while the vehicle is driving along the driving path, determining, by the controller, whether an absolute value of a difference between a current SOC and a targeted SOC is greater than a set SOC.

2. The method of claim 1, further comprising:
when the absolute value of the difference between the current SOC and the targeted SOC is greater than the set SOC, operating, by the controller, the engine to be forcibly turned on or off regardless of required power of a driver.

3. The method of claim 1, further comprising:
when the absolute value of the difference between the current SOC and the targeted SOC is less than a set SOC, operating, by the controller, the on or off of the engine based on engine on power and engine off power stored in the required power of the driver and the optimum power distribution map.

4. The method of claim 2, further comprising:
when the current SOC is the set SOC to be less than the targeted SOC, charging, by the controller, the battery by turning on the engine regardless of the required power of the driver.

5. The method of claim 2, further comprising:
when the current SOC is the set SOC greater than the targeted SOC, discharging, by the controller, the battery by turning off the engine regardless of the required power of the driver.

* * * * *